United States Patent
Farmer et al.

(10) Patent No.: US 11,963,528 B2
(45) Date of Patent: Apr. 23, 2024

(54) MATERIALS AND METHODS FOR CONTROL OF INSECT PESTS USING ENTOMOPATHOGENIC FUNGI

(71) Applicant: Locus Solutions IPCo, LLC, Solon, OH (US)

(72) Inventors: Sean Farmer, North Miami Beach, FL (US); Ken Alibek, Solon, OH (US)

(73) Assignee: Locus Solutions IPCo, LLC, Solon, OH (US)

( * ) Notice: Subject to any disclaimer, the term of this patent is extended or adjusted under 35 U.S.C. 154(b) by 810 days.

(21) Appl. No.: 16/971,724

(22) PCT Filed: Feb. 26, 2019

(86) PCT No.: PCT/US2019/019535
§ 371 (c)(1),
(2) Date: Aug. 21, 2020

(87) PCT Pub. No.: WO2019/165413
PCT Pub. Date: Aug. 29, 2019

(65) Prior Publication Data
US 2020/0390106 A1    Dec. 17, 2020

Related U.S. Application Data

(60) Provisional application No. 62/635,247, filed on Feb. 26, 2018.

(51) Int. Cl.
*A01N 43/08* (2006.01)
*A01N 43/16* (2006.01)
*A01N 47/30* (2006.01)
*A01N 59/00* (2006.01)
*A01N 61/00* (2006.01)
*A01N 63/14* (2020.01)
*A01N 63/30* (2020.01)

(52) U.S. Cl.
CPC ............ *A01N 43/08* (2013.01); *A01N 61/00* (2013.01); *A01N 63/14* (2020.01); *A01N 63/30* (2020.01)

(58) Field of Classification Search
None
See application file for complete search history.

(56) References Cited

U.S. PATENT DOCUMENTS

| | | | |
|---|---|---|---|
| 5,296,369 | A | 3/1994 | Mortensen et al. |
| 5,780,023 | A | 7/1998 | McLaughlin et al. |
| 6,638,910 | B2 | 10/2003 | Heins et al. |
| 6,958,146 | B2 | 10/2005 | Askham et al. |
| 7,422,737 | B1 | 9/2008 | Nussinovitch et al. |
| 7,579,183 | B1 | 8/2009 | Hua |
| 8,454,983 | B2 | 6/2013 | DeChant et al. |
| 2004/0096428 | A1 | 5/2004 | Jijakli et al. |
| 2005/0266036 | A1 | 12/2005 | Awada et al. |
| 2009/0170932 | A1 | 7/2009 | Aggarwal et al. |
| 2009/0269308 | A1 | 10/2009 | Dunlap et al. |
| 2009/0280212 | A1 | 11/2009 | Sugimoto et al. |
| 2010/0143316 | A1 | 6/2010 | Hsieh et al. |
| 2011/0033436 | A1 | 2/2011 | Chen et al. |
| 2011/0200572 | A1 | 8/2011 | Reuter |
| 2011/0274673 | A1 | 11/2011 | Kang et al. |
| 2011/0319341 | A1 | 12/2011 | Awada et al. |
| 2012/0058895 | A1 | 3/2012 | Awada et al. |
| 2012/0065229 | A1 | 3/2012 | Esculier |
| 2012/0129695 | A1 | 5/2012 | Tachibana et al. |
| 2012/0220464 | A1 | 8/2012 | Giessler-Blank et al. |
| 2013/0085067 | A1 | 4/2013 | Schofield et al. |
| 2013/0184154 | A1 | 7/2013 | Levy et al. |
| 2013/0202562 | A1 | 8/2013 | Wood |
| 2013/0324406 | A1 | 12/2013 | Chisholm et al. |
| 2014/0323757 | A1 | 10/2014 | Kim |
| 2015/0025141 | A1 | 1/2015 | Black et al. |
| 2015/0045290 | A1 | 2/2015 | Coutte et al. |
| 2015/0305347 | A1 | 10/2015 | Wicks et al. |
| 2015/0373994 | A1 | 12/2015 | Leland et al. |
| 2016/0073640 | A1 | 3/2016 | Curtis et al. |
| 2016/0073642 | A1 | 3/2016 | Ceballos Rojas et al. |
| 2016/0075992 | A1 | 3/2016 | Jackson et al. |
| 2016/0152525 | A1 | 6/2016 | Chelle et al. |
| 2016/0270407 | A1 | 9/2016 | Kellar et al. |
| 2017/0223956 | A1 | 8/2017 | Habib et al. |
| 2018/0317499 | A1 | 11/2018 | Wong |

FOREIGN PATENT DOCUMENTS

| | | | |
|---|---|---|---|
| CN | 1554240 | A | 12/2004 |
| CN | 101057590 | A | 10/2007 |
| CN | 101099490 | * | 1/2008 |

(Continued)

OTHER PUBLICATIONS

Machine translation of CN 101099490 (Jan. 9, 2008).*
Machine translation of JP 5326043 B2 (Oct. 30, 2013).*
Dushay, M. S. "Insect hemolymph clotting." Cellular and molecular life sciences 66 (2009): 2643-2650.
Abdullah, M.T., et al., "Biological control of Sclerotinia sclerotiorum (Lib.) de Bary with Trichoderma harzianum and Bacillus amyloliquefaciens." Crop Protection, 2008, 27: 1354-1359.
Arutchelvi, J.I., et al., "Mannosylerythritol lipids: a review." J Ind Microbiol Biotechnol, 2008, 35: 1559-1570.

(Continued)

*Primary Examiner* — John Pak
(74) *Attorney, Agent, or Firm* — SALIWANCHIK, LLOYD & EISENSCHENK

(57) ABSTRACT

The subject invention relates to the production and use of entomopathogenic fungi for the control of arthropod pests. Specifically, the subject invention provides methods for producing *Metarhizium anisopliae* and *Beauveria bassiana*, as well as methods of their use, as biopesticidal compositions. Compositions are also provided for controlling arthropod pests, comprising one or more entomopathogenic fungi, a chitinase inducer, diatomaceous earth, and an anticoagulant.

9 Claims, No Drawings

(56) References Cited

FOREIGN PATENT DOCUMENTS

| | | | |
|---|---|---|---|
| CN | 102613252 A | | 8/2012 |
| CN | 105567580 A | | 5/2016 |
| CN | 105638748 A | | 6/2016 |
| EP | 0540074 A1 | | 5/1993 |
| EP | 0544039 A1 | | 6/1993 |
| EP | 2351847 A1 | | 8/2011 |
| EP | 2859794 A1 | | 4/2015 |
| JP | H1067613 A | | 3/1998 |
| JP | 2009126820 A | | 6/2009 |
| JP | 2012176906 A | | 9/2012 |
| JP | 5326043 B2 | * | 10/2013 |
| KR | 100424083 B1 | | 3/2004 |
| KR | 20140019992 A | | 2/2014 |
| KR | 20170132149 A | | 12/2017 |
| WO | 8103338 A1 | | 11/1981 |
| WO | 9716974 A1 | | 5/1997 |
| WO | 9856939 A1 | | 12/1998 |
| WO | 03038081 A1 | | 5/2003 |
| WO | 2004020647 A1 | | 3/2004 |
| WO | 2005117929 A1 | | 12/2005 |
| WO | 2010012031 A1 | | 2/2010 |
| WO | 2011011188 A2 | | 1/2011 |
| WO | 2011135937 A1 | | 11/2011 |
| WO | 2013110132 A1 | | 8/2013 |
| WO | 2014043058 A1 | | 3/2014 |
| WO | 2014085576 A1 | | 6/2014 |
| WO | 2014120247 A1 | | 8/2014 |
| WO | 2014170719 A1 | | 10/2014 |
| WO | 2015023662 A1 | | 2/2015 |
| WO | 2015089183 A2 | | 6/2015 |
| WO | 2015153476 A1 | | 10/2015 |
| WO | 2017035099 A1 | | 3/2017 |
| WO | 2017035101 A1 | | 3/2017 |
| WO | 2017151549 A1 | | 9/2017 |
| WO | 2017210166 A1 | | 12/2017 |
| WO | 2018080596 A1 | | 5/2018 |

OTHER PUBLICATIONS

Bashan, Y., "Alginate Beads as Synthetic Inoculant Carriers for Slow Release of Bacteria That Affect Plant Growth." Applied and Environmental Microbiology, May 1986, 51(5): 1089-1098.

De Brito, D., Biosurfactants from renewable raw materials, Universidade do Minho Departamento de Engenharia Biologica, Nov. 2013, pp. 1-93.

Degenkolb, T., et al., "Metabolites from Nematophagous Fungi and Nematicidal Natural Products from Fungi as Alternatives for Biological Control. Part II: Metabolites from Nematophagous Basidiomycetes and Non-nematophagous Fungi." Appl Microbiol Biotechnol, 2016, 100: 3813-3824.

De Oliveira, M., et al., "Review: Sophorolipids A Promising Biosurfactant and it's Applications." International Journal of Advanced Biotechnology and Research, 2015, 6(2): 161-174.

El-Katatny, M.H., et al., "Improvement of Cell Wall Degrading Enzymes Production by Alginate Encapsulated *Trichoderma* spp." Food Technol. Biotechnol., 2003, 41(3): 219-225.

Fan, L., et al., "Advance in glycolipid biosurfactants-mannosylerythritol lipids." Chinese Journal of Biotechnology, Sep. 25, 2013, 29(9): 1223-1233.

Hussein, W., et al., "Systemic Resistance Induction of Tomato Plants against ToMV Virus by Surfactin Produced from Bacillus subtilis BMG02." American Journal of Microbiological Research, 2016, 4(5): 153-158.

Khan, N., et al., "Combating Fusarium Infection Using Bacillus-Based Antimicrobials." Microorganisms, 2017, 5(75): 1-13.

Kim, K., et al., "Characteristics of Sophorolipids as an Antimicrobial Agent." J. Microbiol. Biotechnol., 2002, 12(2): 235-241.

Kim, J., et al., "Nematicidal Activity of Plant Essential Oils and Components from Coriander (*Coriandrum sativum*), Oriental Sweetgum (*Liquidambar orientalis*), and Valerian (*Valeriana wallichii*) Essential Oils against Pine Wood Nematode (*Bursaphelenchus xylophilus*)." J. Agric. Food Chem., 2008, 56(16): 7316-7320.

Kulakovskaya, E., et al., "Structure and Occurrence of Yeast Extracellular Glycolipids." Extracellular Glycolipids of Yeasts, eds E. Kulakovskaya and T. Kulakovskaya (Amsterdam: Elsevier), 2014: 1-13.

Kurtzman, C.P., et al., "Production of sophorolipid biosurfactants by multiple species of the Starmerella (Candida) bombicolayeast clade." FEMS Microbiol Lett, 2010, 311: 140-146.

Lee, G., et al., "Foliar application of the leafcolonizing yeast Pseudozyma churashimaensis elicits systemic defense of pepper against bacterial and viral pathogens." Scientific Reports, Jan. 2017, 7(39432): 1-13.

Limtong, S., et al., "Biocontrol of Rice Seedling Rot Disease Caused by Curvularia lunata and Helminthosporium bryzae by Epiphytic Yeasts from Plant Leaves." Microorganisms, 2020, 8(647): 1-18.

Ma, X., et al., "Surface and biological activity of sophorolipid molecules produced by *Wickerhamiella domercqiae* var. sophorolipid CGMCC 1576." Journal of Colloid and Interface Science, 2012, 376: 165-172.

Meena, K.R., et al., "Lipopeptides as the Antifungal and Antibacterial Agents: Applications in Food Safety and Therapeutics." BioMed Research International, 2015, 2015: Article ID 473050, pp. 1-9.

Morita, T., et al., "Efficient Production of Di- and Tri-acylated Mannosylerythritol Lipids as Glycolipid Biosurfactants by Pseudozyma parantarctica JCM 11752." Journal of Oleo Science, 2008, 57(10): 557-565.

Oro, L., et al., "Biocontrol of postharvest brown rot of sweet cherries by *Saccharomyces cerevisiae* Disva 599, Metschnikowia pulcherrima Disva 267 and Wickerhamomyces anomalus Disva 2 strains." Postharvest Biology and Technology, 2014, 96: 64-68.

Passoth, V., et al., "Past, present and future research directions with Pichia anomala." Antonie van Leeuwenhoek, 2011, 99(1): 121-125.

Saxena, A.K., et al., "*Bacillus* species in soil as a natural resource for plant health and nutrition." Journal of Applied Microbiology, 2019, 128: 1583-1594.

Sen, R., "Biosurfactants: Advances in Experimental Medicine and Biology." Landes Bioscience and Springer Science +Business Media, LLC, 2010, 672: 1-331.

Tayel, A.A., et al., "Antifungal action of Pichia anomala against aflatoxigenic Aspergillus flavus and its application as a feed supplement." J Sci Food Agric, 2013, 93(13): 3259-3263.

Thaniyavarn, J., et al., "Production of Sophorolipid Biosurfactant by Pichia anomala." Bioscience, Biotechnology, and Biochemistry, 2008, 72(8): 2061-2068.

Torres Faria, N., et al., "Production of glycolipid biosurfactants, mannosylerythritol lipids, from pentoses and D-glucose/D-xylose mixtures by Pseudozyma yeast strains." Process Biochemistry, 2014, 49(11): 1790-1799.

Akbar, W., et al., "Diatomaceous Earth Increases the Efficacy of Beauveria bassiana Against Tribolium castaneum Larvae and Increases Conidia Attachment." Journal of Economic Entomology, Apr. 2004, 97(2): 273-280.

Bai, P., et al., "Inhibition of Phenoloxidase Activity Delays Development in Bactrocera dorsalis (Diptera: Tephritidae)." Florida Entomologist, Jun. 2014, 97(2): 477-485.

Krieger De Moraes, C., et al., "Regulation of Extracellular Chitinases and Proteases in the Entomopathogen and Acaricide Metarhizium anisopliae." Current Microbiology, 2003, 46: 205-210.

Luz, C., et al., "Diatomaceous earth and oil enhance effectiveness of Metarhizium anisopliae against Tritoma infestans." Acta Tropica, 2012, 122: 29-35.

Nabaei, N., et a;., "Efficacy of entomopathogenic fungi in combination with diatomaceous earth against Callosobruchus maculatus (Coleoptera: Bruchidae)." Acta Entomologica Sinica, Nov. 2012, 55(11): 1282-1288.

St Leger, R.J., et al., "Cuticle-degrading Enzymes of Entomopathogenic Fungi: Regulation of Production of Chitinolytic Enzymes." Journal of General Microbiology, 1986, 132: 1509-1517.

* cited by examiner

MATERIALS AND METHODS FOR CONTROL OF INSECT PESTS USING ENTOMOPATHOGENIC FUNGI

CROSS-REFERENCE TO RELATED APPLICATION

This application is a National Stage Application of International Application No, PCT/US2019/019535, filed Feb. 26, 2019; which claims priority to U.S. Provisional Application No. 62/635,247, filed Feb. 26, 2018, both of which are incorporated herein by reference in their entirety.

BACKGROUND OF THE INVENTION

In the agriculture industry, certain common issues continue to hinder the ability of farmers to maximize production yields while keeping costs low. These include, but are not limited to, infections and infestations caused by bacteria, fungi, and other pests and pathogens; the high costs of chemical fertilizers and herbicides, including their environmental and health impacts; and the difficulty for plants to efficiently absorb nutrients and water from different types of soil.

Insects, in particular, can significantly impact agricultural production and human health. In addition to destroying agricultural products, insects can transmit diseases, some of which can cause epidemics. Insects can also be nuisances when they are present in homes, lawns and gardens.

Pest control is typically attempted with the use of pesticides, which function by poisoning via oral ingestion, via contact with the pest cuticle, or via the air using fumigants. In the agriculture industry, farmers have relied heavily on the use of synthetic chemical pesticides to protect crops against pathogens, pests, and disease; however, when overused or improperly applied, these substances can pollute air and water through runoff, leaching and evaporation. Even when properly used, the over-dependence and long-term use of certain chemical pesticides and fertilizers deleteriously alters soil ecosystems, reduces stress tolerance, increases pest resistance, and impedes plant and animal growth and vitality. Furthermore, the use of pesticides not only risks the contamination of the environment or agricultural products, but also is harmful to humans. In addition, the use of insecticides may unintentionally harm beneficial species.

Insect-proof barriers, such as meshes, are sometimes used to keep insects off crops, creating a barrier to help reduce the need for chemicals. Insect-proof barriers, however, are not always suitable to the physical situation in which protection from insects is required.

One alternative to the use of chemical insecticides or insect impermeable barriers is the use of insect repellents. Repellents cause insects to be driven away from, or to reject, a particular area or surface. Repellents have been used for the prevention of breeding, biting and stinging of various insect pests.

Various agents have been developed to be used as insect repellents for agricultural, gardening or other purposes. These agents range from naturally occurring extracts to commercially manufactured compounds. The degree of protection, duration of protection, and safety of these agents varies greatly. Examples of insect repellents include oils, such as mineral and vegetable oils, and synthetic chemicals such as N,N-Diethyl-meta-toluamide (DEET). DEET is the major chemical insect repellent in commercial use. In order for DEET to act as a repellent, it must be used at a concentration of about 5-20 volume percent (vol. %). DEET has been found to pose potential health risks, especially for children. Also, DEET has a limited spectrum of activity and a noticeably unpleasant odor.

Mounting regulatory mandates that govern the availability and use of chemicals, as well as consumer demands for residue free, sustainably-grown food produced with minimal harm to the environment, are impacting the pest-control industry and causing an evolution of thought regarding how to address the myriad of challenges. The demand for safer pesticides and alternate pest control strategies is increasing. While wholesale elimination of chemicals is not feasible at this time, farmers are increasingly embracing the use of biological measures as viable components of Integrated Nutrient Management and Integrated Pest Management programs.

For example, biological agents are emerging as an alternative to chemical pesticides, where live microbes, bioproducts derived from these microbes, and combinations thereof are used instead. These biological pesticides have important advantages over other conventional pesticides. For example, they are less harmful compared to the conventional chemical pesticides. They are more efficient and specific. They often biodegrade quickly, leading to less environmental pollution.

One type of microbe that could prove to be useful as a biological agent against insect pests is entomopathogenic fungi (EF). EF are parasitoid fungi that can cause disease and/or death in insects that they infect. They are found naturally in soils worldwide, and belong to a number of different taxa from several fungal groups. Many of these fungi are considered natural control agents and are environmentally safe, making them ideal for use as biological control agents against insects and other arthropod pests in various outdoor applications.

Many EF belong to the fungal order Hypocreales. Examples include, but are not limited to, the genera *Beauveria, Metarhizium, Nomuraea* and *Paecilomyces*. *Metarhizium anisopliae* and *Beauveria bassiana* in particular, can infect cockroaches, grasshoppers, termites, ants, aphids and other arthropods. Due to the social nature of some of these insects, infection of one pest by an EF can lead to infection of others through their direct contact, and can even infect an entire group of insects in a particular area.

Environmental awareness and consumer demand has promoted the search for improved products for pest control and their use in the treatment of agricultural crops, gardens and lawns.

Thus, there is an increasing need for improved pesticidal materials and technologies that are effective for controlling pests and preventing and/or reducing the damage and/or diseases they cause.

BRIEF SUMMARY

The subject invention provides pesticidal compositions and methods of using these compositions to control pests, in particular, arthropod pests. Specifically, the subject invention provides fungal-based pesticidal compositions and methods for controlling pests and protecting plants and plant parts from harmful pests.

The subject invention can also be used for preventing, reducing and/or eliminating infection and/or spread of insect-borne disease through the control of disease vector pests. Even further, the subject invention can be used for reducing nuisance pests in the home, lawn or garden.

Advantageously, the pesticidal compositions and methods of the subject invention are environmentally-friendly, non-toxic and cost-effective.

In preferred embodiments, the subject invention provides pesticidal compositions for controlling an arthropod pest, wherein the composition comprises one or more species of entomopathogenic fungi, a chitinase inducer, and an abrasive substance. Advantageously, the subject pesticidal compositions and methods do not harm insects or other organisms that are beneficial to, for example, agriculture and/or horticulture.

In specific embodiments, the entomopathogenic fungi are selected from *Metarhizium anisopliae* and *Beauveria bassiana*. In preferred embodiments, the composition comprises both *M. anisopliae* and *B. bassiana*.

In one embodiment, the fungi used in the composition are cultivated using solid state, or surface, fermentation. Hybrid systems can also be used.

In one embodiment, the pesticidal composition comprises a chitinase inducer selected from purified, or essentially pure, chitin and/or silkworm in crystals. Silkworm crystals can be obtained from, e.g., the silk production parts (e.g., glands, ducts, spinners) of a silkworm such as, e.g., *Bombyx mori*, which can contain chitin and/or other chitin components. According to the subject invention "essentially pure" can mean, for example, about 80% purity or greater.

In preferred embodiments, the abrasive substance is a powder having a particle size of 1 micrometer to 1 millimeter, preferably from 10 to 200 micrometers. In one embodiment, the abrasive substance comprises pumice powder and/or diatomaceous earth. Diatomaceous earth comprises fossilized remains of diatoms, a type of hard-shelled protist.

In one embodiment, the pesticidal composition can further comprise an anticoagulant substance. In preferred embodiments, the anticoagulant substance is a hemolymph anticoagulant selected from ascorbic acid, phenylthiourea and/or a combination thereof.

In some embodiments, the pesticidal composition can further comprise one or more surfactants, such as, for example, a glycolipid and/or a lipopeptide.

Advantageously, the pesticidal composition is useful for protecting animals, plants or plant parts from, for example, settling, biting, laying eggs and/or feeding thereon by an insect. In specific embodiments, the pesticidal compositions are also useful for protecting agricultural crops from insect infestation, water loss, microbial infection and/or combinations thereof.

In one embodiment, the subject invention provides methods for controlling a pest wherein a pesticidal composition according to the subject invention is contacted with the pest. In preferred embodiments, the pest is an arthropod pest, e.g., an insect.

In preferred embodiments, the method comprises contacting a pesticidal composition comprising one or more species of entomopathogenic fungi, a chitinase inducer, and an abrasive substance with the pest. The method can further comprise contacting one or more anticoagulant substances, such as, e.g., hemolymph coagulants, along with the pesticidal composition.

In certain embodiments, "applying" and/or "contacting" a surface and/or pest comprises spraying or sprinkling the composition onto the surface, pest and/or the environment surrounding the surface and/or pest.

The pests can, for example, cockroaches, termites, ants, grasshoppers, aphids, and/or others that may cause harm, damage and/or disease to animals, plants and/or homes.

In one embodiment, the insect pest is a disease vector, for example, Asian citrus psyllid, which carries a bacterial infection that causes citrus greening disease (*Candidatus Liberibacter* spp.).

In one embodiment, the insect pest is a social insect, characterized by its membership in a structured colony or group comprising a plurality of members of the same species. Advantageously, when one member of the colony or group is contacted with a composition of the subject invention, it will spread the entomopathogenic fungi, and/or other components of the composition, along to other members of the colony with which it interacts, thereby controlling those other members.

In one embodiment, the method comprises applying the composition directly to the pest. In another embodiment, the method comprises applying the composition to a surface upon which the pest may traverse, rest, settle, mate, lay eggs and/or feed. The surface may be, for example, a man-made surface, such as a fence, wall, or other piece of stationary agricultural or horticultural equipment. The surface may have an attractant and/or bait component, for example, a certain color, scent or other physical or chemical signal that is attractive to a specific pest, which lures the pest towards the pesticidal composition.

In certain preferred embodiments, the surface is soil, a plant, or a plant part. The pesticidal compositions can be contacted with any part of the plant, for example, leaves, roots, seeds, stems, flowers, or fruits. Furthermore, the pesticidal compositions can be contacted with an entire plant.

Advantageously, the method can protect plants from damage as a result of pest actions, for example, feeding, laying eggs, or transmission of disease-causing agents.

In one embodiment, the method can be used for inhibiting, preventing or reducing the spread and/or incidence of pest-borne disease, for example, in plants, humans and animals, by, for example, controlling a disease vector pest.

In one embodiment, the method is particularly useful for preventing plant disease by preventing the settling of an infected disease vector onto the plant, thereby inhibiting, preventing or reducing the transport of disease pathogens to the plant.

Advantageously, the present invention can be used without releasing large quantities of inorganic compounds into the environment. Additionally, the subject compositions and methods utilize components that are biodegradable and toxicologically safe.

DETAILED DESCRIPTION

The subject invention provides pesticidal compositions and methods of using these compositions to control pests, in particular, arthropod pests. Specifically, the subject invention provides fungal-based pesticidal compositions and methods for controlling pests and protecting plants and plant parts from harmful pests.

The subject invention can also be used for preventing, reducing and/or eliminating infection and/or spread of insect-borne disease through the control of disease vector pests. Even further, the subject invention can be used for reducing nuisance pests in the home, lawn or garden. Advantageously, the pesticidal compositions and methods of the subject invention are environmentally-friendly, non-toxic and cost-effective.

In preferred embodiments, the subject invention provides pesticidal compositions for controlling an arthropod pest, wherein the composition comprises one or more species of entomopathogenic fungi, a chitinase inducer, and an abrasive substance.

In specific embodiments, the entomopathogenic fungi of the subject pesticidal composition are selected from *Metarhizium anisopliae* and *Beauveria bassiana*. In preferred embodiments, the composition comprises both *M. anisopliae* and *B. bassiana*.

Selected Definitions

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed. In some embodiments, the microbes are present, with medium in which they were grown, in the microbe-based composition. The cells may be present at, for example, a concentration of $1\times10^4$, $1\times10^5$, $1\times10^6$, $1\times10^7$, $1\times10^8$, $1\times10^9$, $1\times10^{10}$, $1\times10^{11}$, $1\times10^{12}$ or $1\times10^{13}$ or more CFU per milliliter of the composition.

The subject invention further provides "microbe-based products," which are products that are to be applied in practice to achieve a desired result. The microbe-based product can be simply the microbe-based composition harvested from the microbe cultivation process, or individual components thereof, such as supernatant. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "harvested" in the context of fermentation processes refers to removing some or all of the microbe-based composition from a growth vessel.

As used herein, a "biofilm" is a complex aggregate of microorganisms, wherein the cells adhere to each other. In some embodiments, biofilms can adhere to surfaces. The cells in biofilms are physiologically distinct from planktonic cells of the same organism, which are single cells that can float or swim in liquid medium.

As used herein, an "isolated" or "purified" nucleic acid molecule, polynucleotide, polypeptide, protein or organic compound such as a small molecule, is substantially free of other compounds, such as cellular material, with which it is associated in nature. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. An "isolated" microbial strain means that the strain is removed from the environment in which it exists in nature. Thus, the isolated strain may exist as, for example, a biologically pure culture, or as spores (or other forms of the strain) in association with a carrier.

As used here in, a "biologically pure culture" is one that has been isolated from materials with which it is associated in nature. In a preferred embodiment, the culture has been isolated from all other living cells. In further preferred embodiments, the biologically pure culture has advantages characteristics compared to a culture of the same microbe as it exists in nature. The advantageous characteristics can be, for example, enhanced probation of one or more by-products of their growth.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism (e.g., a growth by-product) or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites include, but are not limited to, biopolymers, enzymes, acids, solvents, alcohols, proteins, vitamins, minerals, microelements, amino acids, carbohydrates and biosurfactants.

As used herein, the term "plurality" refers to any number or amount greater than one.

As used herein, "reduce" refers to a negative alteration, and the term "increase" refers to a positive alteration, of at least (positive or negative) 1%, 5%, 10%, 25%, 50%, 75%, or 100%.

As used herein, "surfactant" refers to a compound that lowers the surface tension (or interfacial tension) between two liquids or between a liquid and a solid. Surfactants act as, e.g., detergents, wetting agents, emulsifiers, foaming agents, and dispersants. A "biosurfactant" is a surfactant produced by a living organism.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19, or 20 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "agriculture" means the cultivation and breeding of plants, algae and/or fungi for food, fiber, biofuel, medicines, cosmetics, supplements, ornamental purposes and other uses. According to the subject invention, agriculture can also include horticulture, landscaping, gardening, plant conservation, orcharding and arboriculture. Further included in agriculture is the care, monitoring and maintenance of soil.

As used herein, the term "control" used in reference to the activity produced by the subject compositions extends to the act of killing, disabling, immobilizing, or reducing population numbers of a pest, or otherwise rendering the pest substantially incapable of causing harm. Accordingly, "pesticidal" means capable of controlling a pest, and a "pesticidally-effective" amount of a substance is an amount that is capable of pesticidal action.

As used herein, a plant's "surrounding environment" means the soil and/or other medium in which the plant is growing, which can include the rhizosphere. In certain embodiments, the surrounding environment does not extend past, for example, a radius of 100 feet, 10 feet, 8 feet, or 6 feet from the plant.

The description herein of any aspect or embodiment of the invention using terms such as "comprising," "having," "including" or "containing" with reference to an element or elements is intended to provide support for a similar aspect or embodiment of the invention that "consists of," "consists essentially of," or "substantially comprises" that particular element or elements, unless otherwise stated or clearly contradicted by context.

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references referred to or cited herein are incorporated by reference in their entirety, including all figures and tables, to the extent they are not inconsistent with the explicit teachings of this specification.

Pesticidal Compositions According to the Subject Invention

The subject invention provides pesticidal compositions and methods of using these compositions to control pests, in particular, arthropod pests. Specifically, the subject invention provides fungal-based pesticidal compositions and methods for controlling pests and protecting plants and plant parts from harmful pests.

In preferred embodiments, the subject invention provides pesticidal compositions for controlling an arthropod pest, wherein the composition comprises one or more species of entomopathogenic fungi, a chitinase inducer, and an abrasive substance. Advantageously, the subject composition prevents the possibility of pests becoming resistant to the composition, due to the use of two different mechanisms of control: a physical mechanism (loss of bodily liquids) and a biological mechanism (fungal infection). Furthermore, the subject pesticidal compositions and methods do not harm insects or other organisms that are beneficial to, for example, agriculture and/or horticulture.

The entomopathogenic fungi of the subject invention can be any species capable of infecting, and eventually, immobilizing and/or killing an arthropod. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

Entomopathogenic fungi can include, but are not limited to *Beauveria* spp., *Metarhizium* spp., *Paecilomyces* spp., *Lecanicillium* spp., *Nomuraea* spp. and *Entomophthora* spp. In a preferred embodiment, the one or more entomopathogenic fungi is in the form of conidia. Conidia are asexual fungal spores, which are tolerant to high temperatures, relatively stable under different environmental conditions and can be quantified and used as units of measurement to evaluate parameters such fungi viability and lethal dose ($LD_{50}$).

The term "$LD_{50}$" means the median lethal dose of entomopathogenic fungus that kills 50% of the insects receiving that dose and is measured in number of conidia. The $LD_{50}$ can be determined with respect to a group of insects in a laboratory bioassay. The bioassay can be performed by making serial dilutions of the fungus and applying several times an individually known amount to a group of insects and monitoring the daily mortality.

Most entomopathogenic fungi initiate infection by germinating the spores (conidia) that adhere and penetrate the cuticle of the host insect. High humidity is usually required for sporulation. As the fungus penetrates the insect pest's cuticle, the invasive hyphae penetrate host tissues and spread through the body cavity (haemocoele). The bodies or segments of the hyphae are distributed throughout the haemocoele, filling the dying insect with mycelia. Hyphae appear through the insect's integument and produce spores on the external surface of the host. Typically, the insect is eventually killed (sometimes by toxins secreted by the fungus) and new spores are formed in or on the insect (if humidity and temperature are ideal).

In specific embodiments, the entomopathogenic fungi of the subject pesticidal composition are selected from *Metarhizium anisopliae* and *Beauveria bassiana*. In preferred embodiments, the composition comprises both *M. anisopliae* and *B. bassiana*. The composition can also comprise mutants and/or strains of these species.

In a preferred embodiment, the pesticidal compositions of the invention comprise from $1\times10^7$ and $1\times10^{10}$ conidia/mL of the one or more entomopathogenic fungi.

Entomopathogenic fungi can attack the integument of the host using an enzymatic complex. Chitinase is an important component found in this complex, as chitin is often the major component of arthropod exoskeletons. Thus, in one embodiment, the pesticidal composition can comprise a chitinase inducer selected from purified, or essentially pure, chitin and/or silkworm crystals. Silkworm crystals can be obtained from, e.g., the silk production parts (e.g., glands, ducts, spinners) of a silkworm such as, e.g., *Bombyx mori*, which can contain chitin and/or other chitin components. The inclusion of a chitinase inducer increases the chitinase production, resulting in an increase in potential virulence of the fungal-based pesticidal composition.

In one embodiment, an abrasive substance is included in the pesticidal composition. In preferred embodiments, the abrasive substance is in the form of a powder having a particle size of 1 micrometer to 1 millimeter, preferably from 10 to 200 micrometers. In one embodiment, the abrasive substance is selected from pumice powder and diatomaceous earth.

Preferably, the abrasive substance is diatomaceous earth. Diatomaceous earth comprises fossilized remains of a type of hard-shelled protest known as diatoms. Microscopically, the particles are very sharp and can stick to an insect, becoming lodged between its exoskeletal joints. As the insect moves, its body receives cuts and lacerations from the sharp particles. Furthermore, the abrasive particles can scratch away at the insects waxy exoskeletal layer, which then allows internal moisture to escape from the insect's body. The moisturized surface of the insect and the "bleeding" liquids from the circulatory system due to the cuts allow germination of fungal spores, thus increasing the propagation of the fungi and hastening the death of the insect.

In one embodiment, the pesticidal composition can further comprise an anticoagulant substance. In preferred embodiments, the anticoagulant substance is a hemolymph anticoagulant selected from ascorbic acid, phenylthiourea and/or a combination thereof. The addition of the anticoagulant prevents the coagulation of the pest's hemolymph. Preferably, up to 0.1% of one or both of ascorbic acid and phenylthiourea can be used.

The subject composition can further comprise growth by-products of the one or more microorganisms. In one embodiment, the growth by-product is selected from a microbial metabolite, including, for example, an enzyme, a biopolymer, a solvent, an acid, a gas, or a killer toxin. In one embodiment, the growth by-product is a biosurfactant, in purified form or unpurified form.

Biosurfactants form an important class of secondary metabolites that occur in many microorganisms. Biosurfactants are biodegradable and can be efficiently produced using selected organisms on renewable substrates. Most biosurfactant-producing organisms produce biosurfactants in response to the presence of a hydrocarbon source (e.g., oils, sugar, glycerol, etc.) in the growing media. Other media components can also affect biosurfactant production significantly.

Microbial biosurfactants are produced by a variety of microorganisms such as bacteria, fungi, and yeasts. Exemplary biosurfactant-producing microorganisms include *Starmerella* spp. (e.g., *S. bombicola*), *Pseudomonas* spp. (e.g., *P. aeruginosa, P. putida, P. florescens, P. fragi, P. syringae*); *Flavobacterium* spp.; *Bacillus* spp. (e.g., *B. subtilis, B. amyloliquefaciens, B. pumillus, B. cereus, B. licheniformis*); *Wickerhamomyces* spp. (e.g., *W. anomalus*), *Candida* spp. (e.g., *C. albicans, C. rugosa, C. tropicalis, C. lipolytica, C. torulopsis*); *Saccharomyces* (e.g., *S. cerevisiae*); *Pseudozyma* spp. (e.g., *P. aphidis*); *Rhodococcus* spp. (e.g., *R. erythropolis*); *Arthrobacter* spp.; *Campylobacter* spp.; *Cornybacterium* spp.; *Pichia* spp. (e.g., *P. guilliermondii, P. occidentalis*); as well as others.

Biosurfactants include low molecular weight glycolipids (GLs), lipopeptides (LPs), flavolipids (FLs), phospholipids (e.g., cardiolipins), cellobiose lipids, and high molecular weight polymers such as lipoproteins, lipopolysaccharide-protein complexes, and polysaccharide-protein-fatty acid complexes. The common lipophilic moiety of a biosurfactant molecule is the hydrocarbon chain of a fatty acid, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

According to embodiments of this invention, the biosurfactant is able to penetrate through pests' tissues sufficiently and is effective in lesser amounts without the use of adjuvants. It has been found that at concentrations above the critical micelle concentration (CMC), the biosurfactants are able to penetrate more effectively.

In one embodiment, the biosurfactants comprise glycolipids such as, for example, rhamnolipids (RLP), sophorolipids (SLP), trehalose lipids or mannosylerythritol lipids (MEL). In one embodiment, the biosurfactants comprise lipopeptides, such as, e.g., surfactin, iturin, fengycin, viscosin, athrofactin, and/or lichenysin. In one embodiment, the biosurfactants comprise polymeric biosurfactants, such as, for example, emulsan, lipomanan, alasan, and/or liposan.

Preferably, the total concentration of biosurfactants in the biopesticide composition is about 0.001 to 10.0%, preferably from about 0.01 to 5%, more preferably about 0.01 to 1%.

The pesticidal composition is preferably formulated for application to soil, seeds, whole plants, or plant parts (including, but not limited to, roots, tubers, stems, flowers and leaves). In certain embodiments, the composition is formulated as, for example, dust, granules, microgranules, pellets, wettable powder, flowable powder, emulsions, microcapsules, oils, or aerosols.

To improve or stabilize the effects of the composition, it can be blended with suitable adjuvants and then used as such or after dilution if necessary. In preferred embodiments, the composition is formulated as a dry powder or as dry granules, which can be mixed with water and other components to form a liquid product.

In one embodiment, the pesticidal composition can be mixed with an acceptable carrier. The acceptable carrier for purposes of the present invention can be defined as a substance or mixture of substances (e.g., oils, emulsions and suspensions) capable of dispersing the active components without affecting its ability to perform its intended function. The compositions may be in the form of oil, emulsion or suspension type. The term "oil" is intended to include substances that are viscous, oily liquid at ordinary temperatures. The oils may be petroleum or vegetable. Light oils include paraffinic oils, and other petroleum-based oils and vegetable oils, such as, e.g., those derived from corn, coconut, canola, cottonseed, soybeans, sunflower seeds and palm kernel.

In some embodiments, the pesticidal composition further comprises a bait or attractant component. For example, natural or synthetic fragrances, chemo-attractants, dyes and/or other sensory attractants can be included in the composition in order to draw pests towards the composition to effectively control them. In certain embodiments, the attractant and/or bait is specific to a particular insect pest, control of which is desired, so as to avoid drawing in and harming advantageous insects.

Advantageously, the pesticidal composition is useful for protecting animals, plants or plant parts from, for example, settling, biting, laying eggs and/or feeding thereon by an insect. In specific embodiments, the pesticidal compositions are also useful for protecting agricultural crops from insect infestation, water loss, microbial infection and/or combinations thereof.

Methods of Controlling an Insect Pest

In one embodiment, the subject invention provides methods for controlling a pest wherein a pesticidal composition according to the subject invention is contacted with the pest. In preferred embodiments, the pest is an arthropod pest, e.g., an insect.

In preferred embodiments, the method comprises contacting a pesticidal composition comprising one or more species of entomopathogenic fungi, a chitinase inducer, and an abrasive substance, with the pest. The method can further comprise contacting one or more anticoagulant substances, such as, e.g., hemolymph coagulants, with the pest.

In certain embodiments, the pest is contacted with the composition through application of the composition directly to a pest, and/or to a surface with which the pest comes into contact. "Applying" a composition comprises spraying, sprinkling, spreading, dipping, or otherwise broadcasting the composition onto the surface, pest and/or the environment surrounding the surface and/or pest.

In one embodiment, the method comprises applying the composition directly to the pest. In another embodiment, the method comprises applying the composition to a surface upon which the pest may traverse, rest, settle, mate, lay eggs and/or feed. The surface may be, for example, a man-made surface, such as a fence, wall, or other piece of stationary agricultural or horticultural equipment.

In one embodiment, the pest is a disease vector, for example, Asian citrus psyllid, which carries a bacterial infection that causes citrus greening disease (*Candidatus Liberibacter* spp.).

In one embodiment, the pest is a social insect, characterized by its membership in a structured colony or group comprising a plurality of members of the same species. Advantageously, when one member of the colony or group is contacted with a composition of the subject invention, it will spread the entomopathogenic fungi, and/or other components of the composition, along to other members of the colony with which it interacts, thereby controlling those other members.

In one embodiment, the pesticidal composition is applied inside an insect trap having the pesticidal composition therein. Insect pests can be lured into the trap by, for example, an attractant chemical, pheromone, fragrance or visual lure. In one embodiment, the lure does not lure in advantageous insects. Then, the pest can be contacted with the pesticidal composition while inside the trap. Examples of traps that can be used according to the invention include, but are not limited to, light traps, adhesive traps, pan traps, bucket traps, bottle traps, flight interception traps, Malaise traps, pitfall traps, grain probes, spikes, subterranean bait systems and soil emergence traps.

In one embodiment, the pesticidal compositions can be contacted with any part of a plant, for example, leaves, roots, seeds, stems, flowers, or fruits. The pesticidal compositions can be contacted with an entire plant. Furthermore, the pesticidal compositions can also be applied to the soil in which a plant grows, and/or the air surrounding the plant.

Plants and/or their environments can be treated at any point during the process of cultivating the plant. For example, the pesticidal composition can be applied to the plant and/or its environment prior to, concurrently with, or after the time when seeds are planted. It can also be applied at any point thereafter during the development and growth of the plant, including when the plant is flowering, fruiting, and during and/or after abscission of leaves.

In certain embodiments, the plant receiving treatment is healthy. In other embodiments, the plant is affected by a plant disease or plant disease symptom.

The methods can further comprise adding materials to enhance growth of the entomopathogenic fungi during application. In one embodiment, the growth enhancers comprise nutrient sources such as, for example, sources of nitrogen, potassium, phosphorus, magnesium, proteins, vitamins and/or carbon.

In one embodiment, the method can be used for inhibiting, preventing or reducing the spread and/or incidence of pest-borne disease, for example, in plants, humans and animals, by, for example, controlling a disease vector pest.

In one embodiment, the method is particularly useful for preventing plant disease by preventing the settling of an infected disease vector onto the plant, thereby inhibiting, preventing or reducing the transport of disease pathogens to the plant.

In one embodiment, the method can be used to control pests that are considered nuisances in the home, garden and/or lawn. For example, the pesticidal composition can be applied using, for example, a handheld sprayer, to the lawn, garden, and landscaping surrounding a home to, for example, reduce the populations of a pest that might infest such areas and/or that might enter the home undesirably.

The subject method can also be used in combination with other agricultural or horticultural plant management systems. In one embodiment, the composition can optionally comprise, or be applied with, natural and/or chemical fertilizers and/or sources of plant nutrients.

In one embodiment, the method can be used in a large scale agricultural setting. The method can comprise administering the pesticidal composition into a tank connected to an irrigation system used for supplying water, fertilizers or other liquid compositions to a crop, orchard or field. Thus, the plant and/or soil surrounding the plant can be treated with the pesticidal composition via, for example, soil injection, soil drenching, or using a center pivot irrigation system, or with a spray over the seed furrow, or with sprinklers or drip irrigators. Advantageously, the method is suitable for treating hundreds of acres of crops, orchards or fields at one time.

In one embodiment, the method can be used in a smaller scale setting, such as in a home garden, lawn or greenhouse. The method can comprise pouring the pesticidal composition into the tank of a handheld lawn and garden sprayer having water and optionally other pesticides and nutrient sources therein, and spraying a plant and/or its surrounding environment with the mixture.

In certain embodiments, the methods and compositions according to the subject invention reduce damage to a plant caused by pests by about 5%, 10%, 20%, 30%, 40%, 50%, 60% 70%, 80%, or 90% or more, compared to plants growing in an untreated environment.

In certain embodiments, the methods and compositions according to the subject invention lead to an increase in crop yield by about 5%, 10%, 20%, 30%, 40%, 50%, 60% 70%, 80%, or 90% or more, compared to untreated crops.

In one embodiment, the methods of the subject invention lead to a reduction in the number of pests on a plant or in a plant's surrounding environment by about 5%, 10%, 20%, 30%, 40%, 50%, 60% 70%, 80%, or 90% or more, compared to a plant growing in an untreated environment.

In one embodiment, the methods of the subject invention lead to an increase in the mass of a plant by about 5%, 10%, 20%, 30%, 40%, 50%, 60% 70%, 80%, or 90% or more, compared to a plant growing in an untreated environment.

Target Pests

The subject methods can be used to control arthropod pests that can infest crops, gardens, lawns, homes, greenhouses, and the like. In specific embodiments, the pest is an insect.

As used herein, a "pest" is any organism, other than a human, that is destructive, deleterious and/or detrimental to humans or human concerns (e.g., agriculture). Pests may cause and/or carry agents that cause infections, infestations and/or disease. Pests may cause direct harm, for example, by eating parts of a plant. Pests may be single- or multi-cellular organisms, including but not limited to, bacteria, viruses, fungi, parasites, protozoa, arthropods and/or nematodes.

In some embodiments, the pest is an arthropod, which includes insects. As used herein, the term "insect" refers to any member of a large group of invertebrate animals characterized in the adult state by division of the body into head, thorax, and abdomen, three pairs of legs, and, often (but not always) two pairs of membranous wings. This definition therefore includes, but not limited to a variety of biting/stinging insects (e.g., ants, bees, black flies, chiggers, fleas, green head flies, mosquitoes, stable flies, ticks, and wasps), Wood-boring insects (e.g., termites), noxious insects (e.g., house flies, cockroaches, lice, roaches, and wood lice), and household pests (e.g., flour and bean beetles, dust mites, moths, silverfish, bed bugs, carpet beetles, furniture beetles, book lice, clothes moths, spiders and weevils). Other examples include locusts, caterpillars, bugs, hoppers, and aphids. This definition also includes non-adult insect states include larva and pupa.

Examples of pests for which the subject invention is useful include, but are not limited to, cockroaches, grasshoppers, termites, ants, mites, thrips, aphids, mealybugs, psyllids, soft scales, whiteflies, leafhoppers, weevils, true bugs, borers, beetles, *Delphacidae* (e.g., *Laodelphax striatellus, Nilaparvata lugens*, or *Sogatella furcifera*); *Deltocephalidae* (e.g., *Nephotettix cincticeps*); *Aphididae* (e.g., *Aphis gossypii, Myzus persicae, Brevicoryne brassicae, Macrosiphum euphorbiae, Aulacorthum solani, Rhopalosiphum padi*); *Pentatomidae* (e.g., *Nezara antennata, Riptortus clavetus, Leptocorisa chinensis, Eysarcoris parvus*, or *Halyomorpha mista*); *Aleyrodidae* (e.g., *Trialeurodes vaporariorum, Bemisia tabaci*); *Pyralidae* (e.g., *Chilo suppressalis, Tryporyza incertulas, Cnaphalocrocis medinalis, Notarcha derogata, Piodia interpunctella, Ostrinia furnacalis* or *Hellula undalis*); *Noctuidae* (e.g., *Spodoptera litura, Spodoptera exigua, Mythimna separata, Mamestra brassicae, Agrotis ipsilon, Plusia nigrisigna, Trichoplusia* spp., *Heliothis* spp., or *Helicoverpa* spp.); *Pieridae* (e.g., *Pieris rapae*); *Tortricidae* (e.g., *Leguminivora glycinivorella, Matsumuraeses azukivora*) and *Yponomeutidae* (e.g., *Plutella rylostella*); *Frankliniella occidentalis, Thrips palmi, Scirtothrips dorsalis, Thrips tabaci, Frankliniella intonsa*; *Anthomyiidae* (e.g., *Delia platura*, or *Delia antiqua*); *Agromyzidae* (e.g., *Agromyza oryzae, Hydrellia griseola, Liriomyza sativae, Liriomyza trifolii*, or *Chromatomyia horticola*); *Chloropidae* (e.g., *Chlorops oryzae*); *Drosophilidae*; Corn root worms (*Diabrotica* spp.) (e.g., *Diabrotica virgifera virgifera*, or *Diabrotica undecimpunctata howardi*); *Scarabaeidae* (e.g., *Anomala cuprea, Anomala rufbcuprea*, or *Popillia japonica*); *Curculionidae* (e.g., *Sitophilus zeamais, Lissorhoptrus oryzophilus, Echinocnemus squameus*, or *Anthonomus grandis*); *Chlysomelidae* (e.g., *Oulema oryzae, Aulacophora femoralis, Phyllotreta striolata*, or *Leptinotarsa decemlineata*); *Elateridae* (*Agriotes* spp.); *Paederus fuscipes*; and any other that may cause damage and/or disease to plants and/or homes.

Further examples of arthropods and/or insects include psyllids such as Asian Citrus Psyllid (*Diaphorina citri*), an African Citrus Psyllid (*Trioza erytreae*), a Pear Psyllid (*Cacopsylla* (*Psylla*) *pyri*), a Carrot Psyllid (*Trioza apicalis*), a Potato Psyllid (*Bactericera* (*Paratrioza*) *cockerelli*), and any psyllid of the family Psyllidae; moths such as European Grapevine Moth (*Lobesia botrana* or EGVM), False Codling Moth (*Thaumatotibia leucotreta* or FCM), European Gypsy Moth (*Lymantria dispar* or EGM), Indian Meal Moth (*Plodiainterpunctella*), Angoumois Grain Moth (*Sitotroga cerealella*), Rice moth (*Corcyra cephalonica*), and Light Brown Apple Moth (*Epiphyas postvittana* or LBAM); beetles such as Asian Longhorned Beetle (*Anoplophora glabripennis*, or ALB), Coconut Rhinoceros Beetle (*Oryctes rhinoceros*), Emerald Ash Borer beetle (*Agrilus planipennis* or EAB), Rust Red Flour Beetle (*Tribolium* spp.), Sawtooth Grain Beetle (*Oryzaephilussurinamensis*), Flat Grain Beetle (*Cryptolestes* spp.), and Khapra Beetle (*Trogoderma granarium*); flies such as Mediterranean Fruit Fly (*Ceratitis capitata* or Medfly), Mexican Fruit Fly (*Anastrepha ludens*), and Oriental Fruit Fly (*Bactrocera dorsalis*); flies, such as sand flies, horse flies, tsetse flies, deer flies and eye gnats such as *Hippelates*; ants such as Imported fire ants (*Solenopsis invicta*); and mosquitoes such as the genus *Anopheles, Trypanosoma, Aedes* spp. (e.g., *Aedes aegypti*), *Culex, Mansonia*, and *Anopheles*.

In some embodiments, the pest is a disease vector, i.e., a carrier for a pathogenic agent such as a bacteria, fungus, parasite or virus. In some plant diseases caused by plant pathogenic bacteria (especially in those that cause spots, cankers, blights, galls, or soft rots), the bacteria can escape to the surface of their host plants as droplets or masses of sticky exudates. The bacterial exudates are released through cracks or wounds in the infected area, or through natural openings in the infected area of the plant. Such bacteria are then likely to stick on the legs and bodies of insects, such as flies, aphids, ants, beetles, whiteflies, etc., that land on the plant and come in contact with the substance.

When the insects move to other parts of the plant or to other susceptible host plants, they carry numerous bacteria on their body. If the insects happen to land on a fresh wound or on a natural opening in a plant, and there is enough moisture on the plant surface, the bacteria may multiply, move into the plant, and begin a new infection. Thus, the subject methods can prevent the spread of plant pathogens by controlling, i.e., killing, these carrier pests.

In one embodiment, the method is used for preventing the spread of a pathogenic bacteria. For example, an arthropod pest may carry a pathogenic strain of *Pseudomonas* (e.g., *P. savastanoi, P. syringae* pathovars); *Ralstonia solanacearum; Agrobacterium* (e.g., *A. tumefaciens*); *Xanthomonas* (e.g., *X. oryzae* pv. Oryzae, *X. campestris* pathovars, *X. axonopodis* pathovars); *Erwinia* (e.g., *E. amylovora*); *Xylella* (e.g., *X. fastidiosa*); *Dickeya* (e.g., *D. dadantii* and *D. solani*); *Pectobacterium* (e.g., *P. carotovorum* and *P. atrosepticum*); *Clavibacter* (e.g., *C. michiganensis* and *C. sepedonicus*); *Candidatus Liberibacter asiaticus; Pantoea; Burkholderia; Acidovorax; Streptomyces; Spiroplasma*; and/or *Phytoplasma*; as well as huanglongbing (HLB, citrus greening disease), citrus canker disease, citrus bacterial spot disease, citrus variegated chlorosis, brown rot, citrus root rot, citrus and black spot disease.

In one embodiment, the method is used for preventing the spread of a pathogenic viruses. For example, an arthropod pest may carry a virus such as *Carlavirus, Abutilon, Hordeivirus, Potyvirus, Mastrevirus, Badnavirus, Reoviridae, Fijivirus, Oryzavirus, Phytoreovirus, Mycoreovirus, Rymovirus, Tritimovirus, Ipomovirus, Bymovirus, Cucumovirus, Luteovirus, Begomovirus, Rhabdoviridae, Tospovirus, Comovirus, Sobemovirus, Nepovirus, Tobravirus, Benyvirus, Furovirus, Pecluvirus, Pomovirus*; alfalfa mosaic virus; beet mosaic virus; cassava mosaic virus; cowpea mosaic virus; cucumber mosaic virus; panicum mosaic satellite virus; plum pox virus; squash mosaic virus; tobacco mosaic virus; tulip breaking virus; and zucchini yellow mosaic virus.

Target Plants

As used here, the term "plant" includes, but is not limited to, any species of woody, ornamental or decorative, crop or cereal, fruit plant or vegetable plant, flower or tree, macroalga or microalga, phytoplankton and photosynthetic algae (e.g., green algae *Chlamydomonas reinhardtii*). "Plant" also includes a unicellular plant (e.g. microalga) and a plurality of plant cells that are largely differentiated into a colony (e.g. volvox) or a structure that is present at any stage of a plant's development. Such structures include, but are not limited to, a fruit, a seed, a shoot, a stem, a leaf, a root, a flower petal, etc. Plants can be standing alone, for example, in a garden, or can be one of many plants, for example, as part of an orchard, crop or pasture.

Example of plants for which the subject invention is useful include, but are not limited to, cereals and grasses (e.g., wheat, barley, rye, oats, rice, maize, sorghum, corn), beets (e.g., sugar or fodder beets); fruit (e.g., grapes, strawberries, raspberries, blackberries, pomaceous fruit, stone fruit, soft fruit, apples, pears, plums, peaches, almonds, cherries or berries); leguminous crops (e.g., beans, lentils, peas or soya); oil crops (e.g., oilseed rape, mustard, poppies, olives, sunflowers, coconut, castor, cocoa or ground nuts); cucurbits (e.g., pumpkins, cucumbers, squash or melons); fiber plants (e.g., cotton, flax, hemp or jute); citrus fruit (e.g., oranges, lemons, grapefruit or tangerines); vegetables (e.g., spinach, lettuce, asparagus, cabbages, carrots, onions, tomatoes, potatoes or bell peppers); Lauraceae (e.g., avocado, Cinnamonium or camphor); and also tobacco, nuts, herbs, spices, medicinal plants, coffee, eggplants, sugarcane, tea, pepper, grapevines, hops, the plantain family, latex plants, cut flowers and ornamentals.

Types of plants that can benefit from application of the products and methods of the subject invention include, but are not limited to: row crops (e.g., corn, soy, sorghum, peanuts, potatoes, etc.), field crops (e.g., alfalfa, wheat, grains, etc.), tree crops (e.g., walnuts, almonds, pecans, hazelnuts, pistachios, etc.), citrus crops (e.g., orange, lemon, grapefruit, etc.), fruit crops (e.g., apples, pears, strawberries, blueberries, blackberries, etc.), turf crops (e.g., sod), ornamentals crops (e.g., flowers, vines, etc.), vegetables (e.g., tomatoes, carrots, etc.), vine crops (e.g., grapes, etc.), forestry (e.g., pine, spruce, eucalyptus, poplar, etc.), managed pastures (any mix of plants used to support grazing animals).

Further plants that can benefit from the products and methods of the invention include all plants that belong to the superfamily Viridiplantae, in particular monocotyledonous and dicotyledonous plants including fodder or forage legumes, ornamental plants, food crops, trees or shrubs selected from *Acer* spp., *Actinidia* spp., *Abelmoschus* spp., *Agave sisalana, Agropyron* spp., *Agrostis stolonifera, Allium* spp., *Amaranthus* spp., *Ammophila arenaria, Ananas comosus, Annona* spp., *Apium graveolens, Arachis* spp., *Artocarpus* spp., *Asparagus officinalis, Avena* spp. (e.g., *A. sativa, A. fatua, A. byzantina, A. fatua* var. *sativa, A. hybrida*), *Averrhoa carambola, Bambusa* sp., *Benincasa hispida, Bertholletia excelsea, Beta vulgaris, Brassica* spp. (e.g., *B. napus, B. rapa* ssp. [canola, oilseed rape, turnip rape]), *Cadaba farinosa, Camellia sinensis, Canna indica, Cannabis sativa, Capsicum* spp., *Carex elata, Carica papaya, Carissa macrocarpa, Carya* spp., *Carthamus tinctorius, Castanea* spp., *Ceiba pentandra, Cichorium endivia, Cinnamomum* spp., *Citrullus lanatus, Citrus* spp., *Cocos* spp., *Coffea* spp., *Colocasia esculenta, Cola* spp., *Corchorus* sp., *Coriandrum sativum, Corylus* spp., *Crataegus* spp., *Crocus sativus, Cucurbita* spp., *Cucumis* spp., *Cynara* spp., *Daucus carota, Desmodium* spp., *Dimocarpus longan, Dioscorea* spp., *Diospyros* spp., *Echinochloa* spp., *Elaeis* (e.g., *E. guineensis, E. oleifera*), *Eleusine coracana, Eragrostis tef, Erianthus* sp., *Eriobotrya japonica, Eucalyptus* sp., *Eugenia uniflora, Fagopyrum* spp., *Fagus* spp., *Festuca arundinacea, Ficus carica, Fortunella* spp., *Fragaria* spp., *Ginkgo biloba, Glycine* spp. (e.g., *G. max, Soja hispida* or *Soja max*), *Gossypium hirsutum, Helianthus* spp. (e.g., *H. annuus*), *Hemerocallis fulva, Hibiscus* spp., *Hordeum* spp. (e.g., *H. vulgare*), *Ipomoea batatas, Juglans* spp., *Lactuca sativa, Lathyrus* spp., *Lens culinaris, Linum usitatissimum, Litchi chinensis, Lotus* sp., *Luffa acutangula, Lupinus* spp., *Luzula sylvatica, Lycopersicon* spp. (e.g., *L. esculentum, L. lycopersicum, L. pyriforme*), *Macrotyloma* spp., *Malus* spp., *Malpighia emarginata, Mammea americana, Mangifera indica, Manihot* spp., *Manilkara zapota, Medicago sativa, Melilotus* spp., *Mentha* spp., *Miscanthus sinensis, Momordica* spp., *Morus nigra, Musa* spp., *Nicotiana* spp., *Olea* spp., *Opuntia* spp., *Ornithopus* spp., *Oryza* spp. (e.g., *O. sativa, O. latifolia*), *Panicum miliaceum, Panicum virgatum, Passiflora edulis, Pastinaca sativa, Pennisetum* sp., *Persea* spp., *Petroselinum crispum, Phalaris arundinacea, Phaseolus* spp., *Phleum pratense, Phoenix* spp., *Phragmites australis, Physalis* spp., *Pinus* spp., *Pistacia vera, Pisum* spp., *Poa* spp., *Populus* spp., *Prosopis* spp., *Prunus* spp., *Psidium* spp., *Punica granatum, Pyrus communis, Quercus* spp., *Raphanus sativus, Rheum rhabarbarum, Ribes* spp., *Ricinus communis, Rubus* spp., *Saccharum* spp., *Salix* sp., *Sambucus* spp., *Secale cereale, Sesamum* spp., *Sinapis* sp., *Solanum* spp. (e.g., *S. tuberosum, S. integrifolium* or *S. lycopersicum*), *Sorghum bicolor, Spinacia* spp., *Syzygium* spp., *Tagetes* spp., *Tamarindus indica, Theobroma cacao, Trifolium* spp., *Tripsacum dactyloides, Triticosecale rimpaui, Triticum* spp. (e.g., *T. aestivum, T. durum, T. turgidum, T hybernum, T. macha, T. sativum, T. monococcum* or *T. vulgare*), *Tropaeolum minus, Tropaeolum majus, Vaccinium* spp., *Vicia* spp., *Vigna* spp., *Viola odorata, Vitis* spp., *Zea mays, Zizania palustris, Ziziphus* spp., amongst others.

Further examples of plants of interest include, but are not limited to, corn (*Zea mays*), *Brassica* sp. (e.g., *B. napus, B. rapa, B. juncea*), particularly those *Brassica* species useful as sources of seed oil, alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum), sweet potato (Ipomoea batatus), cassava (Manihot esculenta), coffee (Coffea spp.), coconut (Cocos nucifera), pineapple (Ananas comosus), citrus trees (Citrus spp.), cocoa (Theobroma cacao), tea (Camellia sinensis), banana (Musa spp.), avocado (Persea americana), fig (Ficus casica), guava (Psidium guajava), mango (Mangifera indica), olive (Olea europaea), papaya (Carica papaya), cashew (Anacardium occidentale), macadamia (Macadamia integrifolia), almond (Prunus amygdalus), sugar beets (Beta vulgaris), sugarcane (Saccharum spp.), oats, barley, vegetables, ornamentals, and conifers.

Vegetables include tomatoes (Lycopersicon esculentum), lettuce (e.g., Lactuca sativa), green beans (Phaseolus vulgaris), lima beans (Phaseolus limensis), peas (Lathyrus spp.), and members of the genus Cucumis such as cucumber (C. sativus), cantaloupe (C. cantalupensis), and musk melon (C. melo). Ornamentals include azalea (Rhododendron spp.), hydrangea (Macrophylla hydrangea), hibiscus (Hibiscus rosasanensis), roses (Rosa spp.), tulips (Tulipa spp.), daffodils (Narcissus spp.), petunias (Petunia hybrida), carnation (Dianthus caryophyllus), poinsettia (Euphorbia pulcherrima), and chrysanthemum. Conifers that may be employed in practicing the embodiments include, for example, pines such as loblolly pine (Pinus taeda), slash pine (Pinus elliotii), ponderosa pine (Pinus ponderosa), lodgepole pine (Pinus contorta), and Monterey pine (Pinus radiata); Douglas-fir (Pseudotsuga menziesii); Western hemlock (Tsuga canadensis); Sitka spruce (Picea glauca); redwood (Sequoia sempervirens); true firs such as silver fir (Abies amabilis) and balsam fir (Abies balsamea); and cedars such as Western red cedar (Thuja plicata) and Alaska yellow-cedar (Chamaecyparis nootkatensis). Plants of the embodiments include crop plants (for example, corn, alfalfa, sunflower, Brassica, soybean, cotton, safflower, peanut, sorghum, wheat, millet, tobacco, etc.), such as corn and soybean plants.

Turfgrasses include, but are not limited to: annual bluegrass (Poa annua); annual ryegrass (Lolium multiflorum); Canada bluegrass (Poa compressa); Chewings fescue (Festuca rubra); colonial bentgrass (Agrostis tenuis); creeping bentgrass (Agrostis palustris); crested wheatgrass (Agropyron desertorum); fairway wheatgrass (Agropyron cristatum); hard fescue (Festuca longifolia); Kentucky bluegrass (Poa pratensis); orchardgrass (Dactylis glomerate); perennial ryegrass (Lolium perenne); red fescue (Festuca rubra); redtop (Agrostis alba); rough bluegrass (Poa trivialis); sheep fescue (Festuca ovine); smooth bromegrass (Bromus inermis); tall fescue (Festuca arundinacea); timothy (Phleum pretense); velvet bentgrass (Agrostis canine); weeping alkaligrass (Puccinellia distans); western wheatgrass (Agropyron smithii); Bermuda grass (Cynodon spp.); St. Augustine grass (Stenotaphrum secundatum); zoysia grass (Zoysia spp.); Bahia grass (Paspalum notatum); carpet grass (Axonopus affinis); centipede grass (Eremochloa ophiuroides); kikuyu grass (Pennisetum clandesinum); seashore paspalum (Paspalum vaginatum); blue gramma (Bouteloua gracilis); buffalo grass (Buchloe dactyloids); sideoats gramma (Bouteloua curtipendula).

Plants of interest include grain plants that provide seeds of interest, oil-seed plants, and leguminous plants. Seeds of interest include grain seeds, such as corn, wheat, barley, rice, sorghum, rye, millet, etc. Oil-seed plants include cotton, soybean, safflower, sunflower, Brassica, maize, alfalfa, palm, coconut, flax, castor, olive etc. Leguminous plants include beans and peas. Beans include guar, locust bean, fenugreek, soybean, garden beans, cowpea, mungbean, lima bean, fava bean, lentils, chickpea, etc.

Further plants of interest include Cannabis (e.g., sativa, indica, and ruderalis) and industrial hemp.

All plants and plant parts can be treated in accordance with the invention. In this context, plants are understood as meaning all plants and plant populations such as desired and undesired wild plants or crop plants (including naturally occurring crop plants). Crop plants can be plants that can be obtained by traditional breeding and optimization methods or by biotechnological and recombinant methods, or combinations of these methods, including the transgenic plants and the plant varieties.

Plant parts are understood as meaning all aerial and subterranean parts and organs of the plants such as shoot, leaf, flower and root, examples which may be mentioned being leaves, needles, stalks, stems, flowers, fruit bodies, fruits and seeds, but also roots, tubers and rhizomes. The plant parts also include crop material and vegetative and generative propagation material, for example cuttings, tubers, rhizomes, slips and seeds.

Growth of Entomopathogenic Fungi According to the Subject Invention

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. These cultivation processes include, but are not limited to, submerged cultivation/fermentation, solid state fermentation (SSF), and modifications, hybrids and/or combinations thereof.

As used herein "fermentation" refers to cultivation or growth of cells under controlled conditions. The growth could be aerobic or anaerobic. In preferred embodiments, the microorganisms are grown using SSF and/or modified versions thereof.

In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, humidity, microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of organisms in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of liquid, and air spargers for supplying bubbles of gas to liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, canola oil, rice bran oil, olive oil, corn oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, sodium chloride, calcium carbonate, and/or sodium carbonate. These inorganic salts may be used independently or in a combination of two or more.

In some embodiments, the method for cultivation may further comprise adding additional acids and/or antimicrobials in the medium before, and/or during the cultivation process. Antimicrobial agents or antibiotics are used for protecting the culture against contamination. Additionally, antifoaming agents may also be added to prevent the formation and/or accumulation of foam when gas is produced during submerged cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the medium may be necessary.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention further provides a method for producing microbial metabolites such as, for example, biosurfactants, enzymes, proteins, ethanol, lactic acid, beta-glucan, peptides, metabolic intermediates, polyunsaturated fatty acid, and lipids, by cultivating a microbe strain of the subject invention under conditions appropriate for growth and metabolite production; and, optionally, purifying the metabolite. The metabolite content produced by the method can be, for example, at least 20%, 30%, 40%, 50%, 60%, 70%, 80%, or 90%.

The biomass content of the fermentation medium (e.g., broth) may be, for example, from 5 g/l to 180 g/l or more or from 10 g/l to 150 g/l. The cell concentration of dried product may be, for example, $1 \times 10^9$, $1 \times 10^{10}$, $1 \times 10^{11}$, $1 \times 10^{12}$ or $1 \times 10^{13}$ cells or spores per gram.

The microbial growth by-product produced by microorganisms of interest may be retained in the microorganisms or secreted into the growth medium. The medium may contain compounds that stabilize the activity of microbial growth by-product.

The method and equipment for cultivation of microorganisms and production of the microbial by-products can be performed in a batch, a quasi-continuous process, or a continuous process.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells, spores, conidia, hyphae and/or mycelia remains in the vessel as an inoculant for a new cultivation batch. The composition that is removed can be a cell-free medium or contain cells, spores, or other reproductive propagules, and/or a combination of thereof. In this manner, a quasi-continuous system is created.

Methods of Solid State Fermentation

In preferred embodiments, the subject invention provides methods of cultivating a microorganism and/or a microbial growth by-product using a novel form of solid state fermentation, or matrix fermentation. Advantageously, the cultivation methods can be scaled up or down in size. Most notably, the methods can be scaled to an industrial scale, meaning a scale that is capable of supplying microbe-based products in amounts suitable for commercial applications, e.g., agriculture.

The subject invention does not require fermentation systems having sophisticated aeration systems, mixers, or probes for measuring and/or stabilizing DO, pH and other fermentation parameters.

In preferred embodiments, the method of cultivating a microorganism and/or producing a microbial growth by-product comprises: a) placing a solid substrate, optionally mixed with nutrients to enhance microbial growth, into a container to form a matrix; b) applying an inoculant of a microorganism to the matrix; c) placing the container with the inoculated matrix into an incubation space; and d) incubating the container at a temperature between 25-40° C. for an amount of time to allow the microorganism to grow through the matrix.

In certain embodiments, the solid substrate comprises a plurality of individual solid items, e.g., pieces, morsels, grains or particles. In preferred embodiments, the solid items are foodstuff. The foodstuff can include one or more of, for example, rice, rice husk, rice bran, beans, lentils, legumes, oats and oatmeal, corn and other grains, pasta, wheat bran, flours or meals (e.g., corn flour, corn steep powder, nixtamilized corn flour, partially hydrolyzed corn meal), and/or other similar foodstuff to provide surface area for the microbial culture to grow and/or feed on.

In one embodiment, wherein the matrix comprises pre-made pasta, the pasta can be made from, for example, corn flour, wheat flour, semolina flour, rice flour, quinoa flour, potato flour, soy flour, chickpea flour and/or combinations thereof. Advantageously, the microbes can grow inside the pasta and/or on outside surfaces of the pasta.

In one embodiment, the method of cultivation comprises preparing the container, which can be, e.g., a tray, a metal sheet pan or a steam pan fitted for a standard proofing oven. Preparation can comprise covering the inside of the containers with, for example, foil. Preparation can also comprise sterilizing the containers by, for example, autoclaving them. Lids, as well as silicon bands, can be provided for sealing the containers, if desired.

Next, a matrix is formed by mixing a foodstuff and a liquid medium comprising additional salts and/or nutrients to support microbial growth. The mixture is then spread into the containers and layered to form a matrix with a thickness of approximately 1 to 12 inches, preferably, 1 to 6 inches.

In preferred embodiments, the matrix substrate serves as a three-dimensional scaffold that provides ample surface area on which microbes can grow. In some embodiments, the foodstuff in the matrix can also serve as a source of nutrients for the microbes. Furthermore, the matrix can provide increased access to oxygen supply when a microorganism requires cultivation under aerobic conditions.

In one embodiment, grooves, ridges, channels and/or holes can be formed in the matrix to increase the surface area upon which the microorganisms can grow. This also increases the depth of microbial growth within the substrate and provides enhanced oxygen penetration throughout the culture during aerobic cultivation.

Sterilization of the containers and matrix can be performed after the matrix has been placed into the container. Sterilization can be performed by autoclave or any other means known in the art. In some embodiments, when, for example, pasta is used as the solid substrate, this process can also effectively cook the substrate. To create a completely sterile system, lids and bands can also be sterilized.

In one embodiment, when a flour or a meal is used as the solid substrate, the method can comprise sectioning or chopping the matrix into chunks. Flours and meals can create a denser matrix than foodstuff having larger individual pieces, especially after it has been subjected to sterilization. Thus, breaking up the dense substrate prior to seeding with a microorganism increases the surface area for microbial growth.

After preparation, the matrix in the container can be inoculated with a desired microorganism that is optionally pre-mixed with sterile nutrient medium. Optionally, depending upon the aeration needs of the microorganism being cultivated, the containers can then be sealed with, for example, the lids and bands. When, for example, an anaerobic microbe is being produced, aeration is not needed and the container can be sealed.

The inoculum preferably comprises vegetative cells, spores, conidia, or other propagules of a desired microorganism, which can be cultivated beforehand using any known fermentation method. In one embodiment, inoculation is performed by applying the inoculum uniformly onto the surface of the matrix. The inoculum can applied via, for example, spraying, sprinkling, pouring, injecting, pipetting or spreading.

The containers with inoculated matrix can then be placed inside an incubation space. In one embodiment, the incubation space is a fermentation reactor. In one embodiment, the fermentation reactor is a proofing oven, such as, for example, a standard proofing oven used in commercial baking. In one embodiment, the incubation space is a thermostable room or enclosure comprising walls, a floor and a ceiling.

Optionally, the incubation space can be equipped with a conveyer system, wherein the inoculated containers move continuously through the space at a speed allowing for culture to grow using, for example, a conveyer belt or a pulley system.

Fermentation parameters within the incubation space can be adjusted based on the desired product to be produced (e.g., the desired microbial growth by-product) and the microorganism being cultivated. Advantageously, in one embodiment, it is not necessary to monitor or stabilize the pH of the culture.

In one embodiment, the incubation space can optionally comprise an aeration system to provide slow motion air supply. The use of an aeration system depends upon the needs of the microorganism being cultivated.

In one embodiment, the use of passive exchange of ambient air can be sufficient to supply the necessary oxygenation to an aerobic culture and to standardize the concentration of air within the incubation space. In one embodiment, this passive air exchange system comprises an inlet, optionally with an air filter, through which ambient air travels into the incubation space, and an outlet, through which air exits the space.

In some embodiments, a vacuum and/or pump system provides air exchange into and out of the incubation space.

In some embodiments, individual containers can comprise inlets and outlets for air exchange. For example, in one embodiment, a container sealed with a lid can comprise an inlet and an outlet fixed to the lid, wherein an air pump supplies slow motion air into the sealed container through tubing attached to the inlet, and air exits the container through tubing attached to the outlet.

The temperature within the incubation space is preferably kept between about 25-40° C. In one embodiment, the temperature is kept at about 25-35° C. In one embodiment, the temperature is kept at about 32-37° C. The exact temperature range will vary depending upon the microorganism being cultivated.

The culture can be incubated for an amount of time that allows for the microorganism to grow and reach a desired concentration. In one embodiment, when the culture is a spore-forming microbe, the incubation time is preferably long enough for the culture to reach 50% to 100% sporulation.

In preferred embodiments, the amount of incubation time is from 1 day to 14 days, more preferably, from 2 days to 10 days.

The containers may be sprayed regularly throughout fermentation (e.g., once a day, once every other day, once per week) with a sterile nutrient medium to increase microbial concentration. In some embodiments, the microorganisms will consume either a portion of, or the entirety of, the matrix substrate throughout fermentation.

The culture and remaining substrate can be harvested from the containers, then blended together to produce a microbial slurry. The microbial slurry can comprise the microbes, their growth by-products, and any remaining nutrients and substrate. The microbial slurry can be processed and further ingredients, e.g., additional nutrients, can be added as deemed necessary for the intended use of the microbe-based product. The concentration of microbes produced according to the subject methods can reach at least $1 \times 10^8$ cells per gram, preferably, from $1 \times 10^{10}$ to $1 \times 10^{12}$ cells, spores or other propagules per gram.

In one embodiment, the microbial slurry is homogenized and dried to produce a dry microbe-based product. Drying can be performed using standard methods in the art, including, for example, spray drying or lyophilization.

In one embodiment, the microbial slurry can be utilized directly, without drying or processing. In another embodiment, the microbial slurry can be mixed with water to form a liquid microbe-based product.

In some embodiments, the various formulations of microbe-based product produced according to the subject methods can be stored prior to their use.

Advantageously, the method does not require complicated equipment or high energy consumption. The microorganisms of interest can be cultivated at small or large scale on site and utilized, even being still-mixed with their media. Similarly, the microbial metabolites can also be produced at large quantities at the site of need.

Advantageously, the microbe-based products can be produced in remote locations. The microbe growth facilities may operate off the grid by utilizing, for example, solar, wind and/or hydroelectric power.

Thermostable Enclosure System

In one embodiment, the fermentation reactor utilized in the subject methods can comprise a large, moisture-sealed, thermostable enclosed space, having four vertical walls, a floor and a ceiling. The walls can optionally comprise one or more windows and/or doors. This thermostable enclosure can replicate the environment that would exist in, for example, a proofing oven fermentation reactor, yet on a much larger scale.

In one embodiment, the thermostable enclosure is fixed onto a portable platform, such as a trailer with wheels.

In one embodiment, the interior of the thermostable enclosure comprises a plurality of horizontal surfaces, upon which the containers with inoculated matrix substrate can be placed.

In one embodiment, the surfaces are in the form of shelves. The shelves can be fixed onto the walls of the enclosure. Shelving units can also be suspended from the ceiling and/or fixed to the floor.

In one embodiment, the thermostable enclosure comprises a plurality of metal sheet pan racks. The sheet pan racks preferably comprise horizontal surfaces in the form of a plurality of slides for holding trays with inoculated matrix substrate. In one embodiment, the racks are portable, for example, fitted with wheels.

In one embodiment, the pan rack can hold from 10 to 50 trays. Preferably, the slides are spaced at least 3 inches apart from one another to allow for optimal air circulation between each tray when growing aerobic microbes.

In one embodiment, the ceiling of the enclosure can optionally be accommodated to allow for air flow, for example, with ceiling vents and/or air filters. Furthermore, the ceiling and walls can be fitted with UV lights to aid in sterilization of air and other surfaces within the system. Advantageously, the use of metal trays and metal pan racks enhances reflection of the UV light for increased UV sterilization.

In one embodiment, the thermostable enclosure can be equipped with standard temperature controls.

The dimensions of the thermostable enclosure can be customized based on various factors, such as, for example, the location of the enclosure and the number of containers to be placed therein. In one embodiment, the height of the ceiling is at least 8 feet, and the area of the floor is at least 80 square feet.

In one embodiment, the method of cultivating a microorganism and/or producing a microbial growth by-product comprises: a) placing a solid substrate, optionally mixed with nutrients to enhance microbial growth, into a container to form a matrix; b) applying an inoculant of a microorganism to the matrix; c) placing the container with inoculated matrix onto a horizontal surface, wherein the surface is inside a thermostable enclosure; and d) incubating the container with the inoculated matrix at a temperature between 25-40° C. for an amount of time to allow the microorganism to grow through the matrix.

In certain embodiments, the container is a sheet pan or tray, and the horizontal surface is a slide in a sheet pan rack. The tray can be places on the slides of the pan rack, along with a plurality of other inoculated trays. In one embodiment, a plurality of sheet pan racks filled with trays is used inside the thermostable enclosure.

Preparation of Microbe-Based Products

One microbe-based product of the subject invention is simply the substrate containing the microorganism and/or the microbial metabolites produced by the microorganism and/or any residual nutrients. Upon harvesting of the solid substrate, microbe, and/or by-products, the product can be homogenized, and optionally, dissolved in water, e.g., in a storage tank. In some embodiments, prior to dissolving in water, the product can be dried using, for example, spray drying or lyophilization. The dried product can also be stored.

The product of fermentation may be used directly without extraction or purification. If desired, extraction and purification can be achieved using standard extraction methods or techniques known to those skilled in the art.

The microorganisms in the microbe-based product may be in an active or inactive form. In some embodiments, the microorganisms have sporulated or are in spore form. The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

In one embodiment, the microbe-based product can comprise at least $1\times10^8$ to $1\times10^{12}$ cells, spores or other propagules per gram. In preferred embodiments, the product comprises at least $1\times10^{10}$ cells, spores or other propagules per gram.

The dried product and/or liquid product containing the dissolved culture can be transferred to the site of application via, for example, tanker for immediate use. Additional nutrients and additives can be included as well.

In other embodiments, the composition (in the form of a dried product or in dissolved liquid form) can be placed in containers of appropriate size, taking into consideration, for example, the intended use, the contemplated method of application, the size of the fermentation vessel, and any mode of transportation from microbe growth facility to the location of use. Thus, the containers into which the microbe-based composition is placed may be, for example, from 1 gallon to 1,000 gallons or more. In certain embodiments the containers are 2 gallons, 5 gallons, 25 gallons, or larger.

Upon harvesting the microbe-based composition from the reactors, further components can be added as the harvested product is processed and/or placed into containers for storage and/or transport. The additives can be, for example, buffers, carriers, other microbe-based compositions produced at the same or different facility, viscosity modifiers, preservatives, nutrients for microbe growth, tracking agents, pesticides, and other ingredients specific for an intended use.

Advantageously, in accordance with the subject invention, the microbe-based product may comprise the substrate in which the microbes were grown. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Local Production of Microbe-Based Products

In certain embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., a citrus grove). For example, the microbe growth facility may be less than 300, 250, 200, 150, 100, 75, 50, 25, 15, 10, 5, 3, or 1 mile from the location of use.

Because the microbe-based product can be generated locally, without resort to the microorganism stabilization, preservation, storage and transportation processes of conventional microbial production, a much higher density of microorganisms can be generated, thereby requiring a smaller volume of the microbe-based product for use in the on-site application or which allows much higher density microbial applications where necessary to achieve the desired efficacy. This allows for a scaled-down bioreactor (e.g., smaller fermentation vessel, smaller supplies of starter material, nutrients and pH control agents), which makes the system efficient and can eliminate the need to stabilize cells or separate them from their culture medium. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have remained in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the medium in which the microbes are grown. If desired, the compositions can have a high density of vegetative cells or propagules, or a mixture of vegetative cells and propagules.

In one embodiment, the microbe growth facility is located on, or near, a site where the microbe-based products will be used (e.g., a citrus grove), for example, within 300 miles, 200 miles, or even within 100 miles. Advantageously, this allows for the compositions to be tailored for use at a specified location. The formula and potency of microbe-based compositions can be customized for specific local conditions at the time of application, such as, for example, which soil type, plant and/or crop is being treated; what season, climate and/or time of year it is when a composition is being applied; and what mode and/or rate of application is being utilized.

Advantageously, distributed microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated medium and metabolites in which the cells are originally grown.

Furthermore, by producing a composition locally, the formulation and potency can be adjusted in real time to a specific location and the conditions present at the time of application. This provides advantages over compositions that are pre-made in a central location and have, for example, set ratios and formulations that may not be optimal for a given location.

The microbe growth facilities provide manufacturing versatility by their ability to tailor the microbe-based products to improve synergies with destination geographies. Advantageously, in preferred embodiments, the systems of the subject invention harness the power of naturally-occurring local microorganisms and their metabolic by-products.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Growth of *Metarhizium Anisopliae* Using Solid-State Fermentation

*Metarhizium anisopliae* was grown by solid-state fermentation using a medium comprising a mixture of rice bran and rice husk with initial water content fixed at a value of about 50%. The medium was spread into metal trays fitted for a standard proofing oven (i.e., used by commercial bakers). Fermentation was then performed in a proofing oven at a temperature of 27±1° C. Fermentation time was 12-14 days.

Example 2—Growth of *Beauveria Bassiana* Using Solid-State Fermentation

A seeding culture of *Beauveria bassiana* with concentration of $1\times10^7$ conidia/g was grown for two days in a 3% corn meal, 2% rice bran, and 2% corn steep powder medium.

The seed culture was added to a wet rice medium (polished white rice, 40% moisture content), with the amount of inoculum equaling 10% of the total amount of medium. The culture was grown in a polyethylene bag.

Using these optimal conditions, 4.05 grams of conidia/100 grams dry rice were obtained after 14 days of cultivation at 25° C.

We claim:

1. A pesticidal composition comprising (a) an effective arthropod-controlling amount of one or more species of entomopathogenic fungi selected from the group consisting of *Metarhizium anisopliae* and *Beauveria bassiana*, (b) a chitinase inducer selected from the group consisting of chitin and silkworm crystals, (c) an abrasive, microscopically sharp substance having a particle size of 1 micrometer to 200 micrometer, selected from the group consisting of diatomaceous earth and pumice powder, and (d) a hemolymph anticoagulant selected from the group consisting of ascorbic acid, phenylthiourea, and a combination thereof, wherein said anticoagulant is present and its concentration does not exceed 0.1%; and wherein the pesticidal composition does not contain a chemical pesticide other than components (b), (c), and (d).

2. A method for controlling an arthropod pest, the method comprising contacting the pest with a pesticidal composition comprising (a) an effective arthropod-controlling amount of one or more species of entomopathogenic fungi selected from the group consisting of *Metarhizium anisopliae* and *Beauveria bassiana*, (b) a chitinase inducer selected from the group consisting of chitin and silkworm crystals, (c) an abrasive, microscopically sharp substance having a particle size of 1 micrometer to 200 micrometer, selected from the group consisting of diatomaceous earth and pumice powder, and (d) a hemolymph anticoagulant selected from the group consisting of ascorbic acid, phenylthiourea, and a combination thereof, wherein said anticoagulant is present and its concentration does not exceed 0.1%; and wherein the pesticidal composition does not contain a chemical pesticide other than components (b), (c), and (d).

3. The method of claim 2, wherein the arthropod pest is an insect pest.

4. The method of claim 2, wherein contacting the pest with a pesticidal composition comprises applying the pesticidal composition to a surface upon which the pest traverses, rests, mates, lays eggs and/or feeds.

5. The method of claim 4, wherein the surface is a plant, or plant part.

6. The method of claim 2, wherein contacting the pest with a pesticidal composition comprises applying the composition directly to the pest via spraying or sprinkling.

7. The method of claim 2, wherein contacting the pest with a pesticidal composition inhibits or reduces the spread or incidence of arthropod pest-borne disease in plants, animals and/or humans.

8. The method of claim 2, wherein contacting the pest with a pesticidal composition inhibits or reduces damage to, and disease in, plants caused by an arthropod pest.

9. The method of claim 2, wherein contacting the pest with a pesticidal composition comprises applying the composition to an insect trap having a chemical attractant, pheromone and/or visual lure therein.

* * * * *